US 8,862,746 B2

(12) United States Patent
Panattu et al.

(10) Patent No.: US 8,862,746 B2
(45) Date of Patent: Oct. 14, 2014

(54) SYSTEMS AND METHODS FOR INTEGRATING APPLICATIONS ON USER EQUIPMENT UTILIZING SPECIAL URI CONTROL MESSAGES

(75) Inventors: Santosh Panattu, Santa Clara, CA (US); Gokulmuthu Narayanaswamy, Bangalore (IN)

(73) Assignee: Sonim Technologies, Inc., San Mateo, CA (US)

( * ) Notice: Subject to any disclaimer, the term of this patent is extended or adjusted under 35 U.S.C. 154(b) by 371 days.

(21) Appl. No.: 11/750,240

(22) Filed: May 17, 2007

(65) Prior Publication Data

US 2007/0276947 A1    Nov. 29, 2007

Related U.S. Application Data

(60) Provisional application No. 60/801,553, filed on May 17, 2006.

(51) Int. Cl.
*G06F 15/16* (2006.01)

(52) U.S. Cl.
USPC .......................................... 709/227; 709/206

(58) Field of Classification Search
USPC ................................................ 709/206, 227
See application file for complete search history.

(56) References Cited

U.S. PATENT DOCUMENTS

2004/0243680 A1    12/2004  Mayer
2006/0116150 A1    6/2006   Bhutiani

FOREIGN PATENT DOCUMENTS

EP              1748660 A1    1/2007
WO    WO-2005-25255 A1    3/2005

OTHER PUBLICATIONS

PCT International Search Report mailed Sep. 25, 2008, re PCT/US2008/063444.

*Primary Examiner* — Rupal D Dharia
*Assistant Examiner* — Adnan Mirza
(74) *Attorney, Agent, or Firm* — Rahman LLC (57) ABSTRACT

Methods for integrating an application on a user equipment (UE) utilizing a special URI (S-URI) control message over a communications network are presented including: registering a secondary application server on the communications network such that a primary application server responsive to the UE is notified of the secondary application server, wherein the secondary application server is configured to provide the application; selecting the application on the UE; sending an INVITE message containing the S-URI to the primary application server by the UE, the S-URI configured to provide access information corresponding with the secondary application server; locating the secondary application server by the communications network; establishing a session between the secondary application server and the UE, wherein the application is provided to the UE by the secondary application server.

28 Claims, 9 Drawing Sheets

| | 802 | 804 | 806 | 808 | 810 | 812 | 814 |
|---|---|---|---|---|---|---|---|
| | SECONDARY APPLICATION | S-URI | OTHER URIs PRESENT? | INCLUDE OTHER URIs IN SESSION? | FLOOR OWNER | SEND FROM S-URI? | MAPPED URIs? |
| | STORING DVM | DVM@DI.COM | Y | N | NOTSPECIAL | N/A | DVMAGENT1@DI.COM<br>DVMAGENT2@DI.COM<br>DVMAGENT3@DI.COM |
| | RETRIEVING DVM | DVM@DI.COM | N | N/A | SPECIAL | N/A | DVMAGENT1@DI.COM<br>DVMAGENT2@DI.COM<br>DVMAGENT3@DI.COM |
| | INITIATING ICC | ICC@DI.COM | Y | N | NONE | N/A | ICCAGENT1@DI.COM |
| | SENDING BUSINESS CARD | SENDBUSINESSCARD@DI.COM | Y | Y | NOTSPECIAL | N | SENDBUSINESSCARD@DI.COM |
| | RECORD SESSION | RECORDER@DI.COM | Y | Y | NOTSPECIAL | N | RECORDER1@DI.COM<br>RECORDER2@DI.COM<br>RECORDER3@DI.COM |

FIG. 8

SYSTEMS AND METHODS FOR INTEGRATING APPLICATIONS ON USER EQUIPMENT UTILIZING SPECIAL URI CONTROL MESSAGES

PRIORITY CLAIM TO PROVISIONAL APPLICATION

A claim for priority is hereby made under the provisions of 35 U.S.C. §119 for the present application based upon U.S. Provisional Application No. 60/801,553, filed on May 17, 2006, which is incorporated herein by reference.

BACKGROUND

OMA POC, PAG 1.0 compliant Push-To-Talk (PTT) services are currently deployed in a SIP/IP core network, e.g. 3GPP IMS networks. In order to establish and maintain a PTT session between PTT clients, SIP signaling is utilized in SIP/IP core networks. PTT clients are resident on handsets or user equipment (UE), which are utilized by users to access a communications network. These UEs are tested in OMA IOP (Interoperability) Forum and GSM Certification Forum (GCF) for protocol and standards compliance. Testing is a lengthy process often requiring a year or more of time to complete. Once the UEs are certified, they are released into a market by UE manufacturers. Released UEs should work with any standard compliant PTT network. However, as lower end UEs often lack capability to update software in the field, they are necessarily restricted to a set of services and protocols that were initially installed on the UEs. Therefore, as networks are upgraded with new applications, it may be desirable for application vendors to come up with technologies that enable seamless integration of new applications and services to existing handsets, which could not otherwise be upgraded.

PTT System Overview

Push-to-talk Over Cellular (PoC) is standardized by Open Mobile Alliance (OMA). This standard is discussed in greater detail in the following technical specifications which are incorporated by reference:

"Push to talk over Cellular Requirements", Candidate Version 1.0-29 Mar. 2005, Open Mobile Alliance™, OMA-RD-PoC-V1_0-20050329-C;

"Push to talk over Cellular Architecture", Candidate Version 1.0-27 Jan. 2006, Open Mobile Alliance™, OMA-AD_PoC-V1_0-20060127-C;

"PoC XDM Specification", Candidate Version 1.0-Jan. 20, 2006, Open Mobile Alliance™, OMA-TS-PoC-XDM-V1_0-20060120-C;

"PoC Control Plane", Candidate Version 1.0-27 Jan. 2006, Open Mobile Alliance™, OMA-TS-PoC-ControlPlane-V1_0-20060127-C; and "PoC user Plane", Candidate Version 1.0-27 Jan. 2006, Open Mobile Alliance™, OMA-TS_PoC-userPlane-V1_0-20060127-C.

The OMA PoC Version 1 standard utilizes SIP protocol for session establishment, session modification, and session tear down. There are several different types of PTT sessions that the user can initiate. For example, there are 1-to-1 sessions, 1-to-many ad hoc sessions, pre-arranged sessions, and chat sessions. 1-to-1 and 1-to-many sessions allow a calling user to call a single called party or a set of called parties. In OMA PoC, each user may have one or more contact and group lists, which contain a list of URIs indicating the contact information of his/her buddies. Contact information is also known as a user selectable list. URIs may be configured as SIP URIs, Tel URIs (Telephone number represented in a URI form), email URIs, or HTTP URIs. When a calling user makes a 1-to-1 call or a 1-to-many ad hoc call, contact information about other users that the calling user wishes to be part of the call is specified in the body of a SIP INVITE message as SIP URI list. The list of users is represented in an XML format and is called the resource list. It may be desirable to make use of this particular method (i.e. adding new URIs to the body of SIP INVITE) to create a special URI (S-URI). Thus, an S-URI may be utilized indicate the type of application or service the user is trying to access.

In addition, a new IETF standard specified in RFC 3680 "A Session Initiation Protocol (SIP) Event Package for Registrations," allows primary application servers, such as a PoC Server, to SUBSCRIBE to registration events in the SIP/IP Core. This functionality allows primary application servers to monitor the registration activity and be notified when S-URIs are registered with a network registrar. It may be desirable to utilize this functionality to detect when new secondary application servers are registering with their SIP URIs. Once a secondary application server registers with a S-URI, the PoC Server (in this case the primary application server) would store that information so that any UE requesting a new application can easily be directed to the new secondary application server identified by the S-URI. As such, systems and method for integrating applications on UE utilizing S-URI control messages are presented.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

Methods for integrating an application on a user equipment (UE) utilizing a special URI (S-URI) control message over a communications network are presented including: registering a secondary application server on the communications network such that a primary application server responsive to the UE is notified of the secondary application server, wherein the secondary application server is configured to provide the application; selecting the application on the UE; sending an INVITE message containing the S-URI to the primary application server by the UE, the S-URI configured to provide access information corresponding with the secondary application server; locating the secondary application server by the communications network; establishing a session between the secondary application server and the UE, wherein the application is provided to the UE by the secondary application server. In some embodiments, the locating the secondary application server includes: determining, by the primary application server, whether the S-URI in the INVITE message matches a stored entry in a local configuration table on the primary application server wherein the stored entry includes a number of fields corresponding with the secondary application server; if a match is found, forwarding the INVITE message to the communications network, determining, by the communications network, whether the secondary application server is registered with the communications network; and if a match is not found, denying access to the secondary application server. In some embodiments, the communications network is a Push-to-Talk-over-Cellular (PoC) network that includes a SIP/IP core for managing a number of SIP sessions, where the SIP/IP core includes: a SIP network registry for providing location information corresponding with a secondary application server; and a SIP proxy for accessing the SIP network registry and for routing SIP messages related to the number of SIP sessions, and where the primary application server is PoC server. In some embodiments, the UE is not field configurable. In some embodiments, the fields include: a type field, an S-URI field, an additional URI indication field, a inclusion URI indication field, a floor owner filed, a send form S-URI indication field, a send HTTP message indication field, a multiple primary application server access indication field, an activation during call indicator field, a hide S-URI indication field, and an include S-URI indication field.

In other embodiments, methods for integrating an application on a user equipment (UE) utilizing a special URI (S-URI) control message over a Push-to-Talk-over-Cellular (PoC) network are presented including: registering a secondary application server on the PoC network such that a PoC server responsive to the UE is notified of the secondary application server, wherein the secondary application server is configured to provide the application; selecting the application on the UE; sending an INVITE message containing the S-URI to the primary application server by a PoC client on the UE, the S-URI configured to provide access information corresponding with the secondary application server; locating the secondary application server by the PoC network; establishing a session between the secondary application server and the UE, wherein the application is provided to the UE by the secondary application server. In some embodiments, locating the secondary application server includes: determining, by the PoC server, whether the S-URI in the INVITE message matches a stored entry in a local configuration table on the PoC server, wherein the stored entry includes a number of fields corresponding with the secondary application server; if a match is found, forwarding the INVITE message to the PoC network, determining, by the PoC network, whether the secondary application server is registered with the PoC network; and if a match is not found, denying access to the secondary application server.

In other embodiments, systems for providing an application to a user equipment (UE) utilizing a special URI (S-URI) control message over a Push-to-Talk-over-Cellular (PoC) network are presented including: a first PoC client for creating the S-URI, wherein the PoC client is resident on a first UE; a PoC server for managing communication between the first PoC client and the PoC network; and a SIP/IP core for managing a number of SIP sessions, wherein the SIP/IP core includes: a SIP network registry for providing location information corresponding with a secondary application server the secondary application server configured to provide the application, and a SIP proxy for accessing the SIP network registry and for routing SIP messages related to the number of SIP sessions. In some embodiments, the PoC server includes a local configuration table for storing and for storing information related the secondary application server. In some embodiments, the local configuration table includes a number of mapped URIs for the S-URI to provide the primary application server with load balancing capability between the mapped URIs. In some embodiments, the application is selected from the group consisting of: a direct voice mail (DVM) application, an instant conference calling (ICC) application, a business card application, and an alarm application. In some embodiments, systems further include: a second UE, the second UE including a second PoC client configured to communicate with the secondary application server; and a network node for providing media between secondary application server and the UEs.

BRIEF DESCRIPTION OF THE DRAWINGS

The present invention is illustrated by way of example, and not by way of limitation, in the figures of the accompanying drawings and in which like reference numerals refer to similar elements and in which.

| GLOSSARY | |
|---|---|
| DM—Device Management | OMA defined protocol for bootstrapping handsets with configuration data from an Over-the-Air (OTA) provisioning server. |
| DVM—Direct Voice Messaging | Direct voice messaging is an example of an enhanced secondary application that can be created using the S-URI concept in a standard OMA PoC environment. In its basic form DVM provides a voice mail function for tahe PoC User. In addition, DVM may also be used to record conversations or explicitly direct sessions to voice mail rather than first attempting to call a user which is commonly utilized in GSM. |
| GSM—Global System for Mobile communication | The second generation digital technology originally developed for Europe but which now has in excess of 71% of the world market. Initially developed for operation in the 900 MHz band and subsequently modified for the 850, 1800 and 1900 MHz bands. |
| GPRS—Generic Packet Radio Service | Packet switched service on GSM networks that provides an Internet Protocol bearer for applications such as PoC. |
| ICC | Instant conference calling is an example of a secondary application on top of a primary application PTT in that ICC utilizes PTT to request the establishment of a circuit switched (of full duplex VoIP) conference session by selecting a set of |

GLOSSARY

| | |
|---|---|
| | contacts in the PTT contact list and a S-URI associated with ICC. The inclusion of the S-URI will trigger a PoC Server to send a HTTP message to the circuit switched conferencing server with all the participants instead of setting up a PTT ad hoc group session. |
| IMS Core—IP Multimedia Subsystem | The SIP/IP Core that controls call sessions over IP networks in cellular networks. |
| MMSC | Multimedia Messaging Services Center is the network node for the MMS application as defined for GSM. MMS allows media in the form of text, pictures and music to be sent between handsets. |
| OMA—Open Mobile Alliance | Standardization organization focused on mobile application specifications such as PoC and PAG. |
| PAG—Presence and Availability Group | Working Group within Open Mobile Alliance (OMA) for the standardization of Presence and List Management services. |
| PoC—Push-to-Talk-over-Cellular | Push-to-Talk standard from OMA using the IP bearer of cellular packet switched networks such as GPRS. |
| Primary Application Server | The application server that was deployed initially along with the User Equipment (UE) or handsets. New applications are invoked in the primary application server through the addition of S-URIs in control messages sent by the UE. In PTT, the PoC Server is the primary application server. |
| PTT—Push-To-Talk | Similar to conventional walkie-talkie communication-users send a voice message to one or more recipients from a mobile phone by pushing a key. |
| RTP—Real-time Transfer Protocol | An IETF protocol for real-time transmission of audio and video. Current IETF RFC is 3550. http://www.ietf.org/rfc/rfc3550.txt |
| SDP—Session Description Protocol | SDP is used for describing and negotiating media characteristics as part of setting up multimedia sessions using SIP. The basic IETF RFC is 2327. http://www.ietf.org/rfc/rfc2327.txt?number=2327 |
| Secondary Application Server | New applications are deployed as secondary application servers. Old PoC Clients with no changes in software may continue to talk to the primary application server. Based on an S-URI present in the request, the primary application server routes the request to the secondary application server. There could be one or more secondary application servers registered with the same S-URI. |
| Shared XDMS— Shared XML Document Management Server | An XCAP server that manages XML documents (e.g. Contact and Group Lists) that are needed for the PoC service and which may be shared with other service enablers (e.g. Presence). |
| SIP—Session Initiation Protocol | A signaling protocol for Internet conferencing, telephony, presence, events notification, and instant messaging. The current IETF RFC is 3261. http://www.ietf.org/rfc/rfc3261.txt?number=3261 |
| Special URI (S-URI) | S-URI is defined in this document to include a URI that is not dedicated to any particular UE but rather is associated with a secondary application invoked by the primary application server if the S-URI is included by UE in control messages such as SIP INVITE and SIP MESSAGE. The primary application server will utilize a configuration table or script to initiate the secondary application, which in turn may involve the primary application server contacting a secondary application server that has registered with the S-URI. |
| TBCP—Talk Burst Control Protocol | A floor control protocol defined by OMA for Push-to-Talk over Cellular (PoC) using RTP control messages. |
| UE—User Equipment | A terminal (e.g. handset or PC) with the PoC Client application installed. |
| URI—Uniform Resource Identifier | A URI is a compact string of characters for identifying an abstract or physical resource. |
| XCAP—XML Configuration Access Protocol | XCAP allows a client to read, write, and modify application configuration data stored in XML format on a server. XCAP maps XML document sub-trees and element attributes to HTTP URIs, so that these components can be directly accessed through HTTP. |
| XDMC—XML Document Managment Client | An XCAP client that manages XML documents stored in the network (e.g. PoC-specific documents in the PoC XDMS and Contact Lists in the Shared XDMS). |
| XDMS—XML Document Managment Server | An XCAP server that manages XML documents (e.g. Contact Lists) that are utilized by various applications. Each application has its own designated XDMS (e.g. PoC XDMS) and can utilize the Shared XDMS. |

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

The present invention addresses the problem of deploying new applications in a backward compatible way without the need to upgrade the client software in UEs by adding a special URI (S-URI) embodied as SIP URIs, HTTP URIs, Tel URIs, or email URIs. S-URIs add information to the body of SIP messages to identify and realize new applications. The system (or user) may enter an S-URI into a user selectable menu (e.g. contact list) on a UE. A user may then select the S-URI along with any called party URI to invoke the new enhanced application in the PTT network at session initiation.

Having SIP URIs in the body of a control message is allowable in the OMA POC 1.0 and IETF SIP URI list standards and is currently utilized to indicate called party(ies) when establishing 1-to-1 and 1-to-many ad hoc PTT calls. This functionality is extended in the present invention to invoke new or enhanced application calls by way of adding an S-URI in the body as well. The added S-URI will trigger special handling and routing in a PTT server to initiate the enhanced, new application. In some embodiments, new applications include: direct voice messaging (DVM), instant conference calling (ICC), and business card application (BCA).

In addition, a SIP User Agent can register a SIP URI (FROM header) and an associated contact URI (same or different) indicating its latest location (associated with a routable IP address) with the Network Registrar of the SIP/IP Core. This information is conventionally utilized by a SIP Proxy server of the SIP/IP core to route SIP messages targeted for a SIP URI. This functionality is extended in the present invention so that new applications may act as SIP User Agents to register with a network registrar of the SIP/IP core using a S-URI (could be shared by multiple application servers) but with a unique location contact URI (one per application server). Information in a S-URI may then be used by SIP Proxies of the SIP/IP core to route (and load balance) any future SIP messages to the S-URI among these new application servers.

Figure 1:
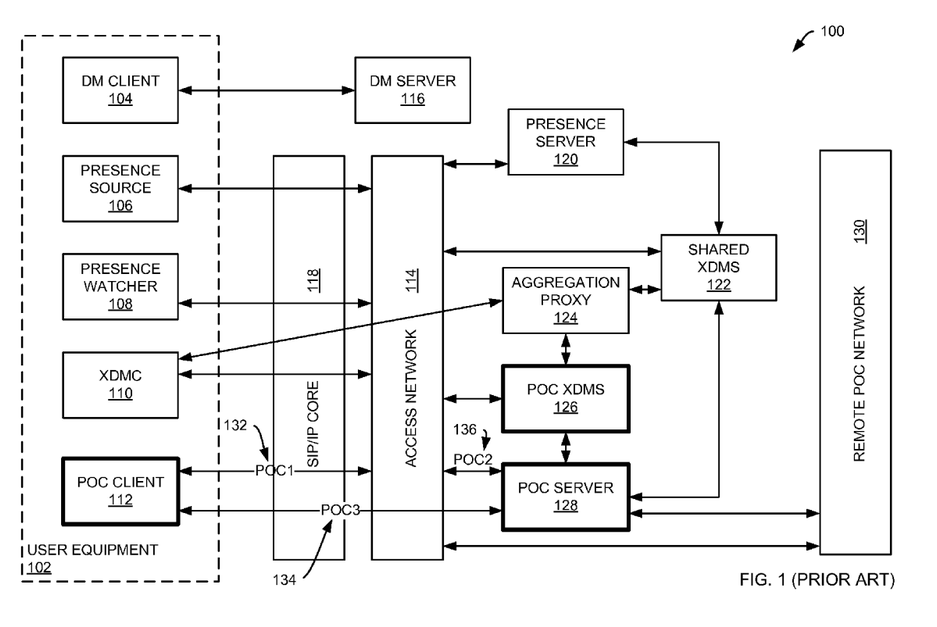
FIG. 1 is an illustrative prior art representation of a PoC system architecture in accordance with OMA PoC version 1 specifications.

FIG. 1 is an illustrative prior art representation of a PoC system architecture in accordance with OMA PoC version 1 specifications. An OMA PoC system architecture 100 includes User Equipment (UE) 102 and a set of network components. As illustrated, UE 102 contains the necessary pieces to interface the user acting as participant in a PoC session under the OMA version 1 specifications. UE 102 can either be a mobile terminal, a PC or any other device connected to the access network. Device Management (DM) client 104 inside UE 102 is used to bootstrap UE 102 with necessary configuration data from a DM server 116. An XML Document Management Client (XDMC) 110 is used to download and update by request any relevant contact lists stored in Shared XML Document Management Server (XDMS) 122. An Aggregation Proxy 124 may be configured to perform the authentication of any such requests. Similarly, the XDMC 110 is also configured to communicate via Aggregation Proxy 124 with PoC-specific XDMS (PoC XDMS) 126 for the purpose of managing group policies and authorization lists. UE 102 further includes Presence Source 106 and Presence Watcher 108. Presence Source 106 may be configured to publish a UE's availability status to other users. Presence Watcher 108 may be configured to retrieve availability status of others (e.g. other UEs and contacts). Both UE presence entities communicate with Presence Server 120 via a SIP/IP Core 118. In an OMA PoC system built on top of an access network 114 such as a GPRS radio network. Further SIP/IP core 118 is often embodied as an IP Multimedia Subsystem (IMS) as standardized by the 3rd Generation Partnership Project (3GPP).

A PoC client's main responsibilities are: session management, SIP registration, TBCP request-response management, media transmission, and media reception. Under existing standards, session management, SIP registration may be accomplished over POC-1 and POC-2 interfaces 132 and 136 respectively. Furthermore, TBCP request-response management, media transmission, and media may be accomplished over POC-3 interface 134. PoC server 128 is responsible for application level network functionality including PoC session establishment, termination, handling of TBCP messages and media switching between the participating clients.

Embodiments of the present invention relate specifically to the POC-1 and POC-2 interfaces between PoC client 112 and PoC server 128. Session Initiation Protocol (SIP) is applied as a signaling protocol over POC-1 132, POC-2 136 interfaces. SIP along with SDP is used for negotiating media, media parameters, and session type (e.g. 1-to-1, ad hoc, prearranged, and chat) between PoC Clients and a PoC Server. POC sessions are established between PoC Clients and PoC Servers after a successful SIP session is negotiated over POC-1 and POC-2 interfaces.

Figure 2:
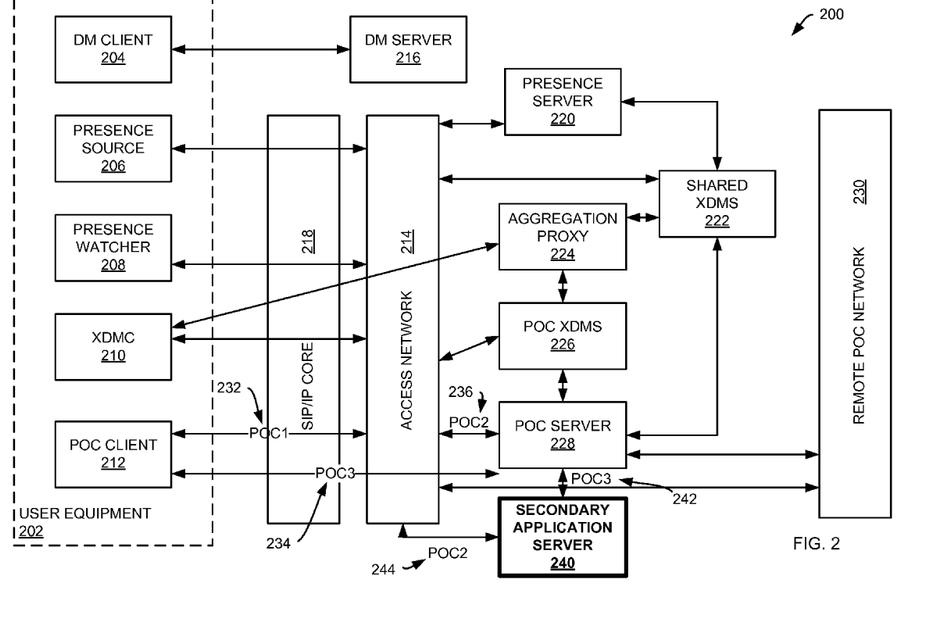
FIG. 2 is an illustrative representation of a PoC system architecture including a secondary application server in accordance with embodiments of the present invention.

FIG. 2 is an illustrative representation of a PoC system architecture including a secondary application server in accordance with embodiments of the present invention. As above for FIG. 1, UE 202 contains the necessary pieces to interface the user acting as participant in a PoC session under the OMA version 1 specifications. UE 202 can either be a mobile terminal, a PC or any other device connected to the access network. Device Management (DM) client 204 inside UE 202 is used to bootstrap UE 202 with necessary configuration data from a DM server 216. An XML Document Management Client (XDMC) 210 is used to download and update by request any relevant contact lists stored in Shared XML Document Management Server (XDMS) 222. An Aggregation Proxy 224 may be configured to perform the authentication of any such requests. Similarly, the XDMC 210 is also configured to communicate via Aggregation Proxy 224 with PoC-specific XDMS (PoC XDMS) 226 for the purpose of managing group policies and authorization lists. UE 202 further includes Presence Source 206 and Presence Watcher 208. Presence Source 206 may be configured to publish a UE's availability status to other users. Presence Watcher 208 may be configured to retrieve availability status of others (e.g. other UEs and contacts). Both UE presence entities communicate with Presence Server 220 via a SIP/IP Core 218. In an OMA PoC system built on top of an access network 214 such as a GPRS radio network. Further SIP/IP core 218 is often embodied a IP Multimedia Subsystem (IMS) as standardized by the 3rd Generation Partnership Project (3GPP).

A PoC client's main responsibilities are: session management, SIP registration, TBCP request-response management, media transmission, and media reception. Under existing standards, session management, SIP registration may be accomplished over POC-1 and POC-2 interfaces 232 and 236 respectively. Furthermore, TBCP request-response management, media transmission, and media may be accomplished over POC-3 interface 234. PoC server 228 is responsible for application level network functionality including PoC session establishment, termination, handling of TBCP messages and media switching between the participating clients.

Embodiments of the present invention relate specifically to the POC-1 and POC-2 interfaces between PoC client 212 and PoC server 228. Session Initiation Protocol (SIP) is applied as a signaling protocol over POC-1 232, POC-2 236 interfaces. SIP along with SDP is used for negotiating media, media parameters, and session type (e.g. 1-to-1, ad hoc, prearranged, and chat) between PoC Clients and a PoC Server. POC sessions are established between PoC Clients and PoC Servers after a successful SIP session is negotiated over POC-1 and POC-2 interfaces. Further, embodiments include a secondary application server 240, which communicates with PoC server 228 over a POC-3 interface 242. Secondary application server 240 may also communicate with access network 214 over POC-2 interface 244.

Figure 3:
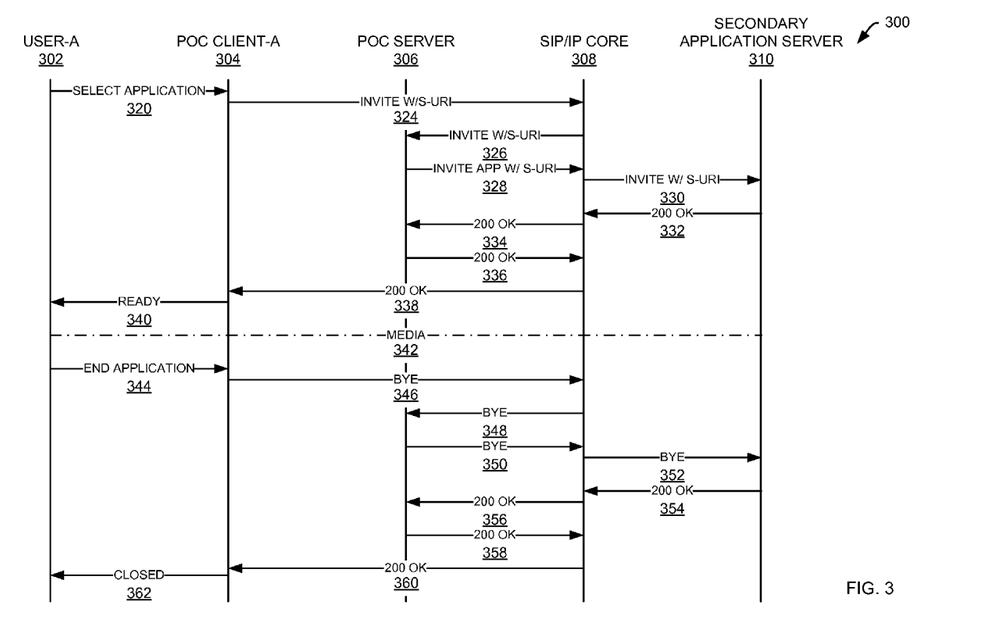
FIG. 3 is an illustrative dataflow diagram illustrating how a new application is integrated with a UE utilizing an S-URI in accordance with embodiments of the present invention.

FIG. 3 is an illustrative dataflow diagram 300 illustrating how a new application is integrated with a UE utilizing an S-URI in accordance with embodiments of the present invention. The dataflow begins when user-A 302 selects application 320 corresponding with a new application server and then depresses a PTT button on the UE to send. In some embodiments, user-A 302 may additionally select users from a contact or group list for inclusion with the application. PoC client-A 304 then sends an INVITE message 324 to SIP/IP core 308, which forwards INVITE message 326 to PoC server 306. INVITE message 326 includes the S-URI and the other users' SIP addresses in the message body containing the XML representation of all URIs (also called the resource list).

After receiving INVITE message 326, PoC server 306 inspects the XML body part of the message to check for any S-URIs. PoC server 306 checks for additional configuration information corresponding with the S-URI before constructing an outgoing SIP INVITE message. If an S-URI is detected, PoC server 306 (acting as primary application server) forwards INVITE message 328 to a SIP proxy of the SIP/IP core 308.

The SIP proxy then checks with the SIP Network Registrar of SIP/IP core 308 for the location information including in the S-URI for routing. Since the new secondary application server serving the S-URI has already been registered and since the location information against the Address Of Record (AOR) is available to the SIP Proxy in this example, SIP proxy would then go ahead and forward INVITE message 330 to secondary application server 310 based on the location information available. Secondary application server 310 may now initiate the new service and may respond with either a 1XX message or a 2XX SIP message depending on the application that is being realized. An application that is being realized may depend on user interaction or may be Automata. Examples applications in some embodiments include: Full Duplex VoIP (user response dependant) and Voice Messaging (Automata). In a use case of Full Duplex VoIP application, which have end user interactions, messages may be proxied by the secondary application server acting as a proxy or a B2BUA (Back to Back user Agent). In a use case of Automata, a secondary application server may immediately send a 2XX response to the INVITE without user interaction. In the embodiment illustrated, secondary application server 310 returns acknowledgement (200 OK) message 332 to SIP/IP core 308. Acknowledgement (200 OK) messages 334, 336, and 338 are then sent as required by SIP standards. The receiving UEs may send a ready indicator 340 such as a 180 ringing followed by a SIP 200 OK if an end user accepts the enhanced application session.

In some embodiments, on receiving a 2XX message from a secondary application server, a PoC server (acting as a primary application server) may choose to modify the SDP before forwarding the SIP 2XX message to a PoC client who initiated the PTT call with the S-URI. An SDP modification is detailed in an embodiment of a PoC Server configuration (see FIG. 8). In some embodiments, a PoC server can also act upon any stored configuration information related to media and floor controls with respect to configuration information in an S-URI. For example, if an S-URI contains information regarding a direct voice messaging (DVM) application, a PoC Server (acting as the primary application server and originator) may immediately assign the floor to the DVM (acting as the secondary application server) so that the DVM can play any initial greetings. This action is contrary to standard OMA PoC behavior where an originator is given the implicit floor after call setup. After the session is established, media 342 may be sent across the network between user-A 302 and secondary application server 310.

At any time during a session, user-A 302, PoC client 304, or secondary application server 310 may terminate. As illustrated, user-A 302 ends application 344, whereupon PoC client-A 304 sends a SIP BYE message 346 to SIP/IP core 308. SIP BYE messages 348, 350, and 352 accordingly traverse the network in accordance with SIP standards, whereupon acknowledgement (200 OK) messages 354, 356, 358, and 360 are returned accordingly. The session is then closed 362 to user-A 302. In this illustrated embodiment, PoC server 306 only applies the routing logic and media handling logic during the setup of the application session. For all other signaling media handling, PoC server acts on the SIP signaling states as a conventional OMA PoC server.

In another embodiment of the current invention, the addition of the special SIP URI is done by software in the PoC client rather than by the user in a selectable list. An example of this latter embodiment is the use of programmable keys on a UE to create an alarm function. An alarm function may be triggered by a single key press whereupon the UE immediately sends a request to the network with an S-URI. When the S-URI is received by a primary application server, an alarm function is automatically initiated with a secondary application server by the primary application server. In this example, an alarm button may correspond with a crisis handling system. Thus, dataflow illustrated in FIG. 3 is preserved in this embodiment a PoC client machine-initiated insertion of the S-URI into the control message.

Figure 4:
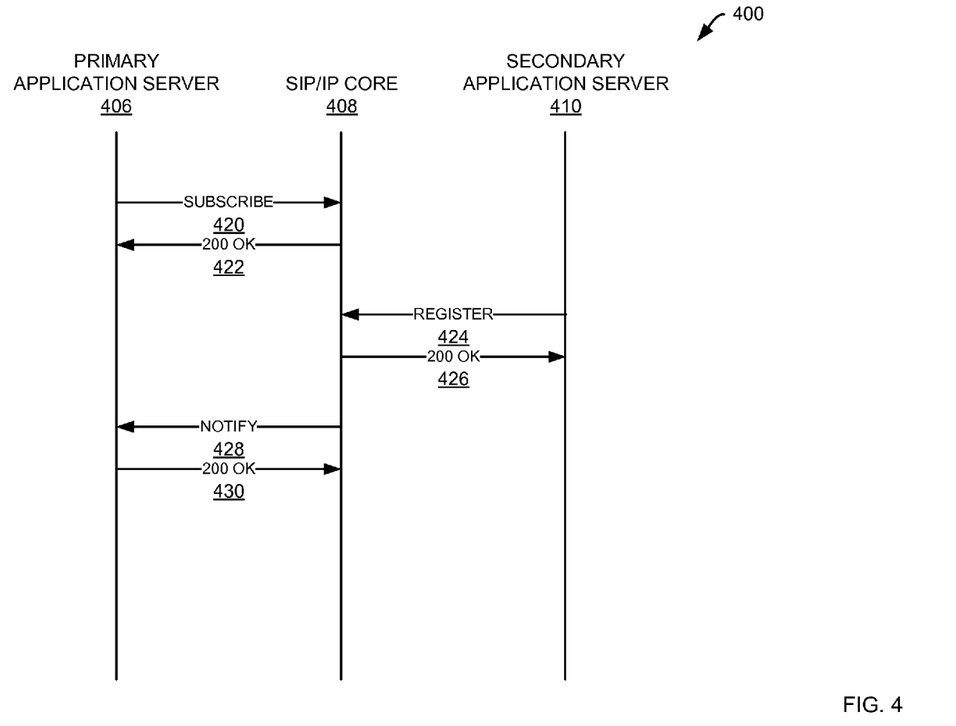
FIG. 4 is an illustrative dataflow diagram illustrating communication between a primary application server and a secondary application server when registering with a network in accordance with embodiments of the present invention.

FIG. 4 is an illustrative dataflow diagram 400 illustrating communication between a primary application server and a secondary application server when registering with a network in accordance with embodiments of the present invention. The dataflow begins when primary application server 406 sends a SUBSCRIBE message 420 to SIP/IP core 408 to subscribe to registration events as per IETF RFC 3680, whereupon SIP/IP core 408 returns acknowledgement (200 OK) message 422 to primary application server 406. Once a primary application server is subscribed, then the server is ready to receive notifications sent by a SIP Network Registrar of SIP/IP core 408 when a new secondary application server registers with SIP/IP core 408. As such, a primary application server can track registration of all new secondary application servers that are available and identify the secondary application servers by their corresponding S-URIs and contact information. In some embodiments, contact information is the same as an S-URI. In some embodiments, contact information is not the same as an S-URI. In some embodiments, a primary application server is a PoC server, although any primary application server known in the art may be utilized without departing from the present invention. At some point in time, secondary application server 410 sends a REGISTER message 424 to SIP/IP core 408 to begin a registration process, whereupon SIP/IP core 408 returns acknowledgement (200 OK) message 426 to secondary application server 410. In some embodiments, a secondary application server may register with a SIP/IP core before a primary application server subscribes with the SIP/IP core.

Once a secondary application server registers with a network, a subscribed primary application server is notified. In the dataflow illustrated, a SIP Network Registrar of SIP/IP core 408 sends a NOTIFY message 428 to primary application server 406 whereupon primary application server 406 returns acknowledgement (200 OK) message 430 to SIP/IP core 408. In some embodiments, multiple secondary application servers may register with the same S-URI, but have different contact SIP URI. In those embodiments, a primary application server (or the SIP/IP Core on its behalf) can load balance service requests among those secondary application servers having the same S-URI in the FROM header but different SIP URI in the contact header of the message.

Figure 5:
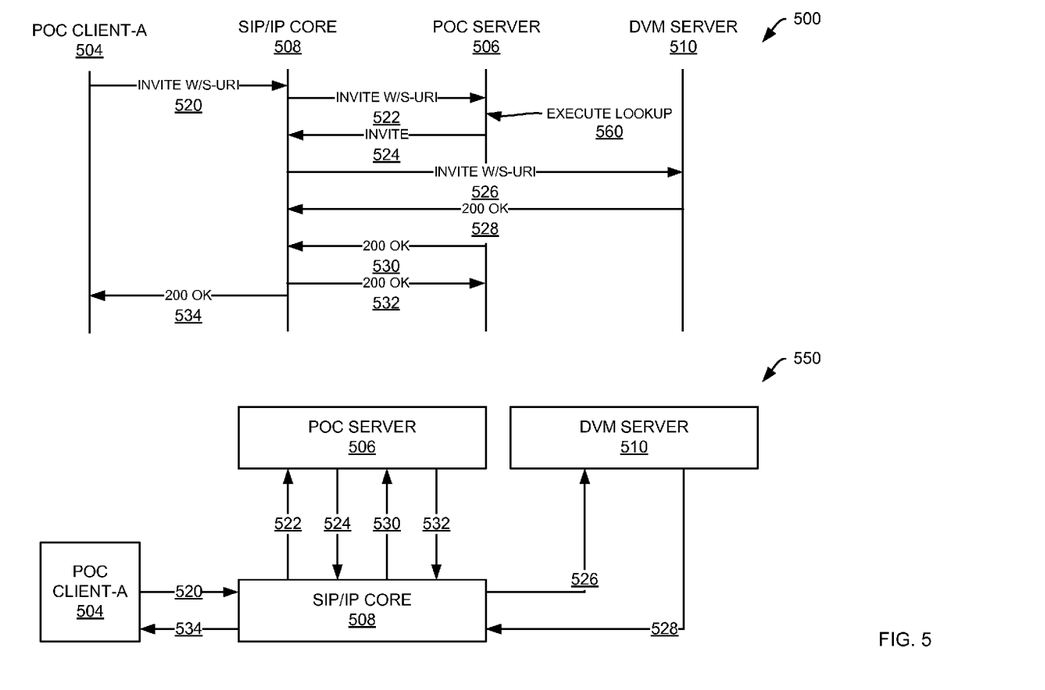
FIG. 5 is an illustrative dataflow diagram and corresponding graphical representation of enabling a direct voice messaging (DVM) application in accordance with embodiments of the present invention.
Figure 8:
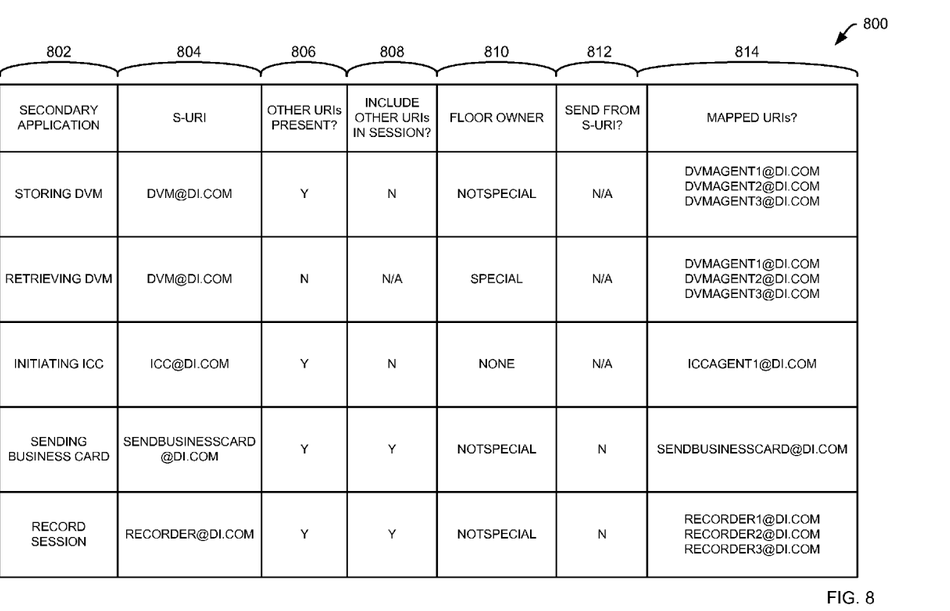
FIG. 8 is an illustrative local configuration table illustrating for providing routing information for secondary application servers in accordance with embodiments of the present invention.

FIG. 5 is an illustrative dataflow diagram 500 and corresponding graphical representation 550 of enabling a direct voice messaging (DVM) application in accordance with embodiments of the present invention. The dataflow begins when PoC client-A 504 sends an INVITE message 520 to SIP/IP core 508. INVITE message 520 includes an S-URI corresponding to a DVM application. SIP/IP core 508 forwards INVITE message 522 to PoC server 506, which is in this example is acting as a primary application server. Upon receiving INVITE message 522, PoC server 506 executes a lookup 560 on a local configuration table such as is illustrated in FIG. 8 below. A local configuration table includes routing information for registered DVM applications (secondary application server). The executed lookup attempts to provide a corresponding DVM for the S-URI in INVITE message 522. If a DVM is found, PoC server 506 forwards INVITE message 524 to SIP/IP core 508 which, in turn, forwards INVITE message 527 to DVM server 510, whereupon DVM server 510 returns acknowledgement (200 OK) message 528 to SIP/IP core 508. Acknowledgement (200 OK) messages 530, 532, and 534 may be subsequently sent in accordance with SIP standards. Once all acknowledgments are delivered, the DVM application then begins to provide the new application experience to an initiating user by, for example, playing out all new voice messages to PoC client-A 504. As may be appreciated, corresponding graphical representation 550 mirrors dataflow 500 and is provided solely for better clarifying embodiments of the present invention.

Figure 6:
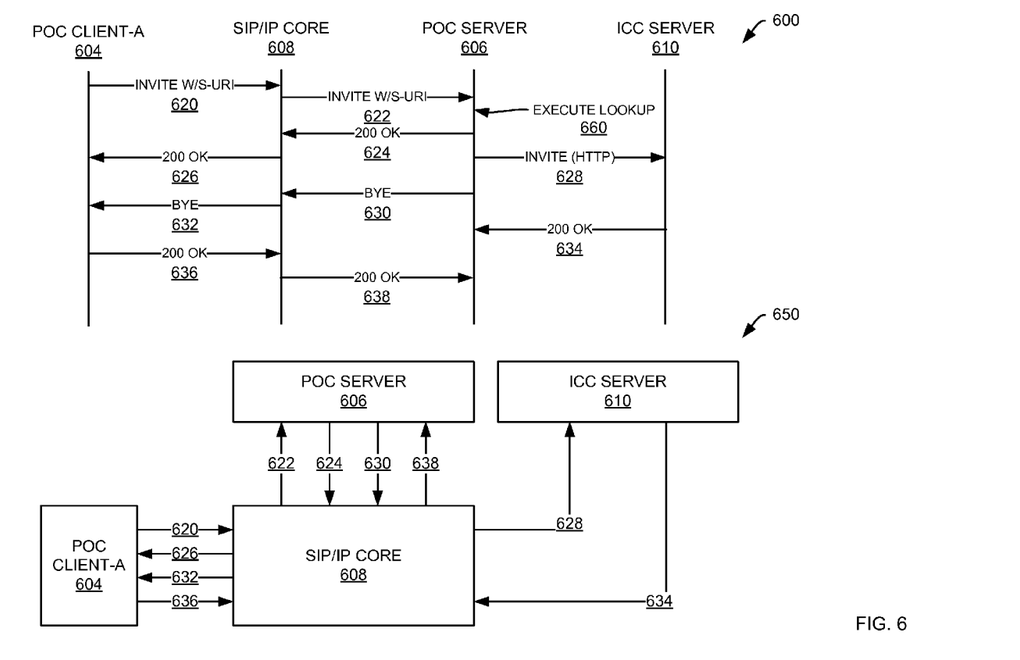
FIG. 6 is an illustrative dataflow diagram and corresponding graphical representation of enabling an instant conference calling (ICC) application in accordance with embodiments of the present invention.

FIG. 6 is an illustrative dataflow diagram 600 and corresponding graphical representation 650 of enabling an instant conference calling (ICC) application in accordance with embodiments of the present invention. The dataflow begins when PoC client-A 604 sends an INVITE message 620 to SIP/IP core 608. INVITE message 620 includes an S-URI corresponding to an ICC application. SIP/IP core 608 forwards INVITE message 622 to PoC server 606, which is in this example is acting as a primary application server, whereupon PoC server 606 returns acknowledgement (200 OK) message 624 to SIP/IP core 608. SIP/IP core 608 then sends acknowledgement (200 OK) message 626 to PoC client-A 604. Upon receiving INVITE message 622, PoC server 606 executes a lookup 660 on a local configuration table such as is illustrated in FIG. 8 below. A local configuration table includes routing information for registered ICC applications (secondary application server). The executed lookup attempts to provide a corresponding ICC for the S-URI in INVITE message 622. If an ICC is found, PoC server 606 sends an HTTP request 628 over an HTTP interface to ICC server 610 to request a chat session, whereupon ICC server 610 returns acknowledgement (200 OK) message 634 to PoC server 606. At some point, PoC server terminates the session by sending BYE message 630 to SIP/IP core 608. SIP/IP core 630, in turn, sends BYE message 632 to PoC client-A 604, whereupon PoC client-A 604 returns acknowledgment (200 OK) message 636 to ICC server 610 and SIP/IP core returns acknowledgement (200 OK) message 638 to PoC server 606. Once the session is terminated, the originator (i.e. PoC client-A 604) and any other participants will be called using circuit-switched dial-out procedures by the ICC server 610. As may be appreciated, corresponding graphical representation 650 mirrors dataflow 600 and is provided solely for better clarifying embodiments of the present invention.

Figure 7A:
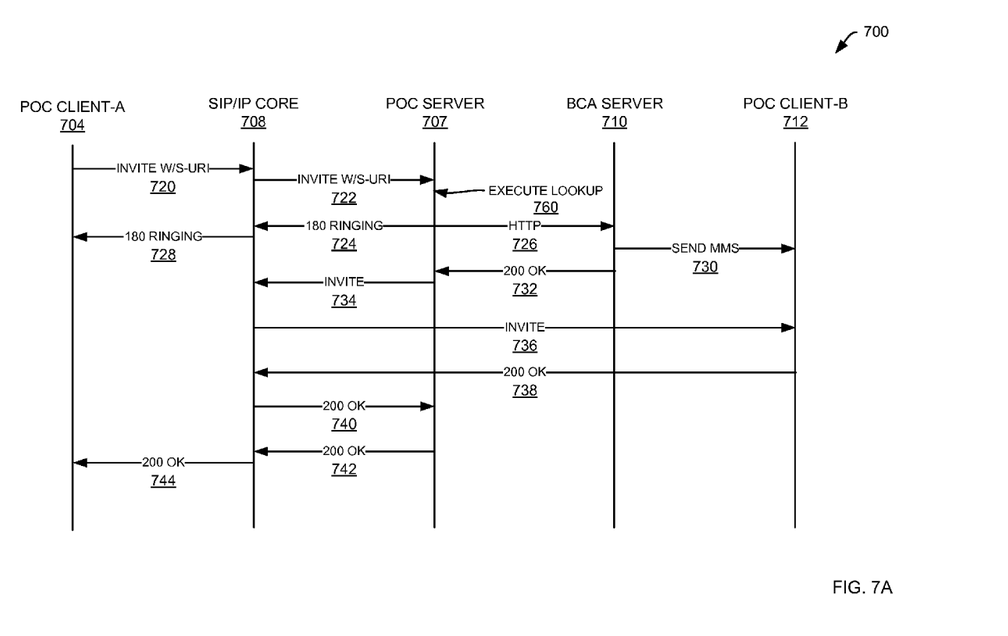
FIGS. 7A-B are an illustrative dataflow diagram and corresponding graphical representation of enabling a business card application (BCA) in accordance with embodiments of the present invention.
Figure 7B:
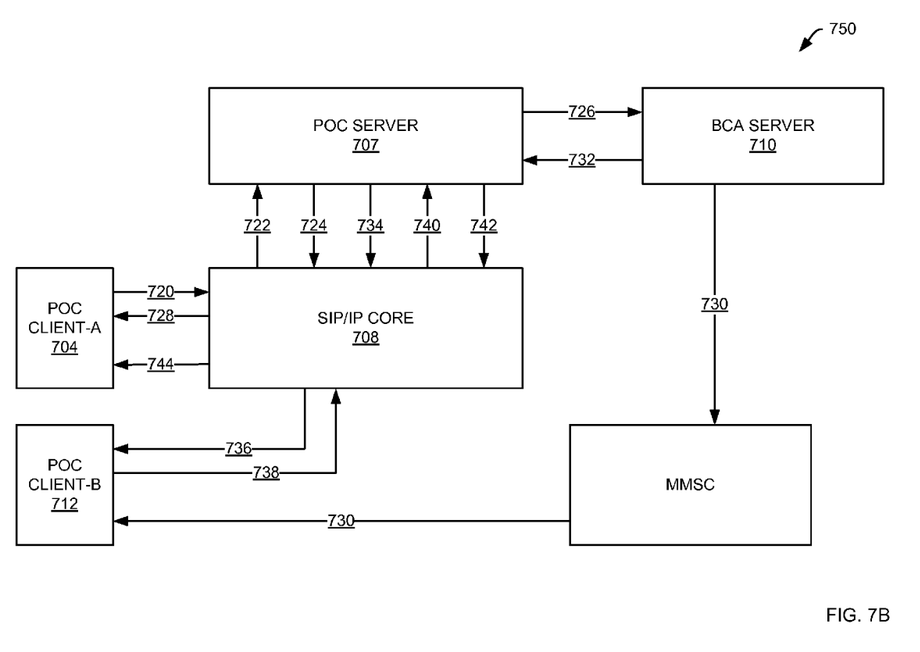

FIGS. 7A-B are an illustrative dataflow diagram 700 and corresponding graphical representation 750 of enabling a business card application (BCA) in accordance with embodiments of the present invention. In this embodiment, PoC client-A 704 desires to share his business card with PoC client-B 712. The dataflow begins when PoC client-A 704 sends an INVITE message 720 to SIP/IP core 708. INVITE message 720 includes an S-URI corresponding to BCA. In some embodiments, the S-URI also includes a list of users to whom an originator intends to send his business card. SIP/IP core 708 forwards INVITE message 722 to PoC server 707. Upon receiving INVITE message 722, PoC server 706 executes a lookup 760 on a local configuration table such as is illustrated in FIG. 8 below. A local configuration table includes routing information for registered BCAs (secondary application server). The executed lookup attempts to provide a corresponding BCA for the S-URI in INVITE message 722. If a BCA is found, PoC server 706 will then send an HTTP request message 726 to BCA server 710 along with the list of users for whom the business card is intended to reach, whereupon BCA server 710 returns acknowledge (200 OK) message 732 to PoC server 707. PoC server 707, in some embodiments, may send a 180 RINGING message 724 to SIP/IP core 708, which is forwarded 728 to PoC client-A 704. Ringing messages may be utilized to indicate a request has been received.

Upon receiving HTTP request message 726, BCA server 710 (acting as the secondary application server) will subsequently send a multimedia message service (MMS) message 730 to PoC client-B 712 and to any other recipients with the business card of the originator (i.e. PoC client-A 704) attached. Once the secondary application has completed sending the business card to all intended recipients, PoC server 707 may send INVITE message 734 to SIP/IP core 708 to continue setting up a PoC session between PoC client-A 704 and PoC client-B 712 where SIP/IP core 708 sends invite message 738 to PoC client-B 712. Acknowledgement (200 OK) messages 738, 740, 742, and 744 may be subsequently sent in accordance with SIP standards. As may be appreciated, corresponding graphical representation 750 mirrors dataflow 700 and is provided solely for better clarifying embodiments of the present invention.

FIG. 8 is an illustrative local configuration table 800 illustrating for providing routing information for secondary application servers in accordance with embodiments of the present invention. As such, in some embodiments, configuration information is utilized by a PoC server to route a call to a new secondary application server. Special media handling for a session can also be configured per new secondary application. Creation of a local configuration table may be accomplished using HTTP WEB, XCAP interface, or any other commonly used management interfaces without departing from the present invention. In some embodiments, some actions are Not Applicable (N/A) for a certain secondary applications. As such, those actions are not evaluated by a PoC server. A local configuration table may contain any number of entries that each include any number of fields illustrated as columns that include information about a secondary application server without departing from the present invention. Example fields are described below.

Column 1 (802) entitled, "Secondary Application," indicates the type of secondary application that corresponds with the S-URI. Examples shown are storing DVM application, retrieving DVM application, initiating ICC application, sending business card application (BCA), and recording session application.

Column 2 (804) entitled, "S-URI," indicates the S-URI associated with the corresponding secondary application. Thus, in one embodiment, if an incoming request matches a stored S-URI value, the match will trigger the primary application server to follow all additional actions identified on the same row.

Column 3 (806) entitled, "Other URIs present?" indicates to the primary application server how to handle additional URIs that may be present in an incoming request. This value provides an additional trigger point for differentiation of a request apart from the S-URI and is exemplified by the two rows for Storing and Retrieving DVM respectively.

Column 4 (808) entitled, "Include other URIs in session?" indicates whether other URIs present in the incoming requests should be copied to an INVITE message when the primary application server initiates the session to a secondary application server.

Column 5 (810) entitled, "Floor owner" indicates who can own the floor in the session. In some embodiments, options include:

None—In this case, there is no media involved at all;
Special—Only secondary application server registered with S-URI;
NotSpecial—Anyone except secondary application server registered with S-URI; and
Anyone—Open to all including secondary application server (normal OMA PoC behavior)

In other embodiments, floor procedures may be further differentiated by separating out initial floor allocation from floor allocation rules during a session.

Column 6 (812) entitled, "Send from S-URI?" indicates whether INVITE messages sent out to called parties shall have the S-URI in the FROM header and whether INVITE messages sent out to called parties shall have the caller's URI in the Referred-By header.

Colum 7 (814) entitled, "Mapped URIs?" stores a list of contact URIs associated with the S-URI (the secondary application). These contact URIs are registered with the network by secondary application servers. Mapped URIs may be utilized by a primary application server to route a request to a corresponding secondary application server. If there are more than one URIs in this column, the primary application server load balance between URIs.

In addition to the actions listed in FIG. 8, some embodiments include a number of additional actions that may be stored in a local configuration table. They are listed below for completeness:

"Send HTTP message to?" indicates whether an S-URI extension shall replace the forwarding of the SIP INVITE and instead send a HTTP message to a secondary application server. In such a case this field specifies an HTTP address of the secondary application server thus, allowing the operator to change the address without requiring the users to update their selectable user list. Note that the use of an HTTP message is only one example message supported by a secondary application server. Other messages may be supported by other secondary application servers without limitation without departing from the present invention.

"Can be used from other PoC servers?" indicates whether an S-URI extension shall be triggered for requests relayed by other PoC servers, e.g. for chat group URIs. That is, this field indicates whether multiple primary application servers may access the secondary application server. One reason for including this action is to determine whether an action should be taken when a primary application server is not the originally participating PoC server in OMA nomenclature. Storing of a DVM is one such example.

"Can be activated during call?" indicates whether an S-URI extension can be activated during a call, i.e. if the S-URI is detected in a SIP REFER message. Business card application and recording application are two such examples.

"Can be deactivated during call?" indicates whether an S-URI extension can be deactivated during a call, i.e. the S-URI is detected in the SIP REFER-BYE message. Recording application is one such example.

"Hide S-URI?" indicates whether an S-URI should be included in information sent to the other recipients. Hiding allows an application, such as recording application, to be an "invisible" part of a session.

"Include S-URI?" indicates whether an S-URI should be included in a PoC session. Business card service is an example of an application where the S-URI is not included in the subsequent SIP INVITE sent to the other recipients.

In other embodiments, a combination of actions may have specific meaning for a PoC server. For example, if both "Include S-URI?" and "Include other URIs in Session" are set to "NO", then the session should be terminated.

In other embodiments, an ID table may be stored on a PoC server. An ID table may be utilized to match a subscriber ID with a secondary application server ID. Information stored in an ID table may be utilized to enable and disable the extensions for specific users. Thus, for example, a user can initiate an enhanced application only if the particular secondary application is enabled for that user as indicated in an ID table.

However, in some embodiments, a user need not have the secondary application enabled to receive PoC sessions with enhanced application treatment.

As may be appreciated, FIG. 8 and accompanying discussion describes actions to be taken by the primary application server with respect to a restricted set of secondary application servers in the form of a database table. However, the present invention is not limited to database table matching analysis of an incoming S-URI. Embodiments of the present invention also allow for the use of scripts and dynamic retrieval of external data through software procedures to determine which actions should be taken when receiving an S-URI in an incoming control message at the primary application server.

Thus, embodiments of the present invention provide UEs with the ability to invoke new secondary applications without any upgrade of existing software and hardware through use of S-URIs in control messages sent to a primary application server. S-URIs trigger a primary application server to perform actions associated with a new secondary application and optionally invoke communication with a secondary application server that previously have been registered with the S-URI on the network.

While this invention has been described in terms of several embodiments, there are alterations, permutations, and equivalents, which fall within the scope of this invention. It should also be noted that there are many alternative ways of implementing the methods and apparatuses of the present invention. For example, as noted above, several embodiments illustrating a PoC server as a primary application server are discussed herein. However, one skilled in the art will readily recognize that any primary application server may be utilized without limitation and without departing from the present invention. Additionally, adding an S-URI to the body of a control message to identify a particular application on a server is not specific to PTT or its related applications, but can easily be applied to other real-time communications applications such as full-duplex VoIP using SIP or similar URL-based protocols. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for integrating an application on a user equipment (UE) utilizing a special URI (S-URI) control message over a communications network, the method comprising:

registering a secondary application server on the communications network such that a primary application server responsive to the UE is notified of the secondary application server, wherein the secondary application server is configured to provide the application, and wherein the application is selected from the group consisting of: a new application and an enhanced application;

selecting the application on the UE;

sending an INVITE message containing the S-URI to the primary application server by the UE, wherein the S-URI configured to provide access information corresponding with the secondary application server, and wherein the S-URI is configured to trigger handling and routing in the primary application server to initiate the application on the UE such that a backward compatibility is achieved;

locating the secondary application server by the communications network, wherein the locating includes determining, by the primary application server, whether the S-URI in the INVITE message matches a stored entry in a local configuration table on the primary application server wherein the stored entry includes a plurality of fields corresponding with the secondary application server wherein said plurality of fields includes a group consisting of: a type held, an S-URI field, an additional URI indication field, a inclusion URI indication field, a floor owner filed, a send form S-URI indication field, a send HTTP message indication field, a multiple primary application server access indication field, an activation during call indicator field, a hide S-URI indication field, and an include S-URI indication field; and establishing a session between the secondary application server and the UE, wherein the application is provided to the UE by the secondary application server based on the access information described in the S-URI.

2. The method of claim 1 wherein the selecting the application further includes:
selecting one or more users from a contact list for inclusion with the application.

3. The method of claim 1 wherein the locating the secondary application server includes:
if a match is found with the stored entry forwarding the INVITE message to the communications network,
determining, by the communications network, whether the secondary application server is registered with the communications network; and
if a match is not found, denying access to the secondary application server.

4. The method of claim 3 wherein the communications network is a Push-to-Talk-over-Cellular (PoC) network that includes a SIP/IP core for managing a plurality of SIP sessions, wherein the SIP/IP core includes:
a SIP network registry for providing location information corresponding with a secondary application server; and
a SIP proxy for accessing the SIP network registry and for routing SIP messages related to the plurality of SIP sessions, and wherein the primary application server is PoC server.

5. The method of claim 1 wherein the UE is not field configurable.

6. The method of claim 1 wherein the application is selected from the group consisting of: a direct voice mail (DVM) application, an instant conference calling (ICC) application, a business card application, and an alarm application.

7. The method of claim 1 wherein the S-URI is selected from the group consisting or a SIP URI, an HTTP URI, a Tel URI, and an email URI.

8. The method of claim 3 wherein the local configuration table includes a plurality of mapped URIs for the S-URI to provide the primary application server with load balancing capability between the plurality of mapped URIs.

9. The method of claim 4 wherein the PoC server further includes an ID table for matching a subscriber ID with a secondary application server ID for providing information to enable and disable access to the secondary application server by the UE.

10. The method of claim 4 wherein the UE includes a PoC client for managing communication between the UE and the communications network.

11. The method of claim 10 wherein the PoC client is configured to automatically access the secondary application server when a triggering event is performed.

12. A method for integrating an application on a user equipment (UE) utilizing a special URI (S-URI) control message over a Push-to-Talk-over-Cellular (PoC) network, the method comprising:
registering a secondary application server on the PoC network such that a PoC server responsive to the UE is notified of the secondary application server, wherein the secondary application server is configured to provide the application, and wherein the application is selected from the group consisting of: a new application and an enhanced application;
selecting the application on the UE;
sending an INVITE message containing the S-URI to the primary application server by a PoC client on the UE, wherein the S-URI configured to provide access information corresponding with the secondary application server, and wherein the S-URI is configured to trigger handling and routing in the PoC server to initiate the application on the UE such that a backward compatibility is achieved;
locating the secondary application server by the PoC network, wherein the locating includes determining, by the PoC server, whether the S-URI in the INVITE message matches a stored entry in a local configuration table on the primary application server wherein the stored entry includes a plurality of fields corresponding with the secondary application server wherein said plurality of fields includes a group consisting of: a type field, an S-URI field, an additional URI indication field, a inclusion URI indication field, a floor owner filed, a send form S-URI indication field, a send HTTP message indication field, a multiple primary application server access indication field, an activation during call indicator field, a hide S-URI indication field, and an include S-URI indication field; and
establishing a session between the secondary application server and the UE, wherein the application is provided to the UE by the secondary application server based on the access information described in the S-URI.

13. The method of claim 12 wherein the selecting the application further includes:
selecting one or more users from a contact list for inclusion with the application.

14. The method of claim 12 wherein the locating the secondary application server includes:
determining, by the PoC network, whether the secondary application server is registered with the PoC network; and
if a match is not found, denying access to the secondary application server.

15. The method of claim 14 wherein the PoC network includes a SIP/IP core for managing a plurality of SIP sessions, wherein the SIP/IP core includes:
a SIP network registry for providing location information corresponding with a secondary application server; and
a SIP proxy for accessing the SIP network registry and for routing SIP messages related to the plurality of SIP sessions.

16. The method of claim 12 wherein the UE is not field configurable.

17. The method of claim 12 wherein the application is selected from the group consisting of: a direct voice mail (DVM) application, an instant conference calling (ICC) application, a business card application, and an alarm application.

18. The method of claim 12 wherein the S-URI is selected from the group consisting of: a SIP URI, an HTTP URI, a Tel URI, and an email URI.

19. The method of claim 14 wherein the local configuration table includes a plurality of mapped URIs for the S-URI to provide the PoC server with load balancing capability between the plurality of mapped URIs.

20. The method of claim 15 wherein the PoC server further includes an ID table for matching a subscriber ID with a secondary application server ID for providing information to enable and disable access to the secondary application server by the UE.

21. The method of claim 15 wherein the UE includes a PoC client for managing communication between the UE and the PoC network.

22. The method of claim 21 wherein the PoC client is configured to automatically access the secondary application server when a triggering event is performed.

23. A system for providing an application to a user equipment (UE) utilizing a special URI (S-URI) control message over a Push-to-Talk-over-Cellular (PoC) network, the system comprising:
a first PoC client for creating the S-URI, wherein the PoC client is resident on a first UE;
a PoC server for managing communication between the first PoC client and the PoC network wherein said PoC server is responsive to the S-URI control message, and wherein the PoC server includes a plurality of secondary application servers configured to provide the application to UE via access network,
wherein said PoC server includes a local configuration table for storing and for storing information related the secondary application server.
wherein said local configuration table includes a plurality of mapped URIs for the S-URI to provide the primary application server with load balancing capability between the plurality of mapped URIs, and
wherein the local configuration table further includes a plurality of fields selected from the group consisting of: a type field, an S-URI field, an additional URI indication field, a inclusion URI indication field, a floor owner filed, a send form S-URI indication field, a send HTTP message indication field, a multiple primary application server access indication field, an activation during call indicator field, a hide S-URI indication field, and an include S-URI indication field;
a group consisting of a secondary application server and a plurality of secondary application servers configured to provide the application to UE via access network; and
a SIP/IP core for managing a plurality of SIP sessions, wherein the SIP/IP core includes:
a SIP network registry for providing location information corresponding with a secondary application server the secondary application server configured to provide the application, wherein the SIP network registry is responsive to the S-URI, wherein the S-URI is configured to trigger handling and routing of the request from UE in such a manner that a group consisting of a secondary application server, tertiary application server or any other number of dependent servers provides an application to UE, and
a SIP proxy for accessing the SIP network registry and for routing SIP messages related to the plurality of SIP sessions.

24. The system of claim 23 wherein the PoC server fwiher includes an ID table for matching a subscriber ID with a secondary application server ID for providing information to enable and disable access to the secondary application server by the UE.

25. The system of claim 23 wherein the S-URI is selected from the group consisting of: a SIP URI, an HTTP URI, a Tel URI, and an email URI.

26. The system of claim 23 wherein the application is selected from the group consisting of: a direct voice mail (DVM) application, an instant conference calling (ICC) application, a business card application, and an alarm application.

27. The system of claim 26 further including:
a second UE, the second UE including a second PoC client configured to communicate with the secondary application server; and
a network node for providing media between secondary application server and the UEs.

28. The system of claim 27 wherein the media is selected from the group consisting of: text, pictures, and music.

* * * * *